(12) United States Patent
Güntherberg et al.

(10) Patent No.: US 8,362,200 B2
(45) Date of Patent: Jan. 29, 2013

(54) ROTOR/STATOR DEVICE AND METHOD FOR SALT-FREE COAGULATION OF POLYMER DISPERSIONS

(75) Inventors: Norbert Güntherberg, Speyer (DE); Wolfgang Fischer, Walldorf (DE); Manfred Radulla, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 707 days.

(21) Appl. No.: 11/816,362

(22) PCT Filed: Feb. 8, 2006

(86) PCT No.: PCT/EP2006/050749
§ 371 (c)(1),
(2), (4) Date: Feb. 24, 2010

(87) PCT Pub. No.: WO2006/087279
PCT Pub. Date: Aug. 24, 2006

(65) Prior Publication Data
US 2010/0210804 A1    Aug. 19, 2010

(30) Foreign Application Priority Data
Feb. 15, 2005 (DE) .......................... 10 2005 006 765

(51) Int. Cl.
*C08F 6/00* (2006.01)
(52) U.S. Cl. ................ 528/502 R; 528/480; 528/502 C; 528/502 F; 528/936; 516/1; 516/9; 516/77; 516/98; 516/924; 366/138; 366/150.1; 366/184; 366/286

(58) Field of Classification Search .................. 528/480, 528/502 R, 502 C, 502 F, 936; 366/138, 366/150.1, 184, 241, 279, 285, 286; 516/1, 516/9, 77, 98, 99, 107, 924, FOR. 163, DIG. 1
See application file for complete search history.

(56) References Cited

U.S. PATENT DOCUMENTS 6,187,825 B1 *  2/2001  Guntherberg et al. ........ 516/197
6,498,232 B1 * 12/2002  Guntherberg et al. .... 528/502 R

OTHER PUBLICATIONS

Machine translation of DE 19720959, Mertens et al, Nov. 1998.*
Office translation of DE 4110943 (Nagy, Adalbert).*

* cited by examiner

*Primary Examiner* — Frances Tischler
(74) *Attorney, Agent, or Firm* — Connolly Bove Lodge & Hutz

(57) ABSTRACT

A process for the salt-free coagulation of polymer dispersions in a rotor/stator assembly is disclosed. The rotor/stator assembly includes a casing, a rotor shaft rotatably mounted within the casing, a rotor having a conical surface affixed to the rotor shaft, and a stator affixed to the casing and concentrically associated with the rotor. The conical surface faces a surface of the stator to form an adjustable shear gap, which is surrounded by an annular space. A polymer dispersion is fed into the assembly and conveyed through the shear gap. During this conveyance, the polymer dispersion is precipitated at a predetermined shear rate and a predetermined shear deformation. The polymer dispersion is discharged from the assembly through an outlet neck, and the assembly is flushed with water using one or more ports formed in at least one of a pipeline coupled to the axial feed neck, the stator, and the casing.

10 Claims, 1 Drawing Sheet

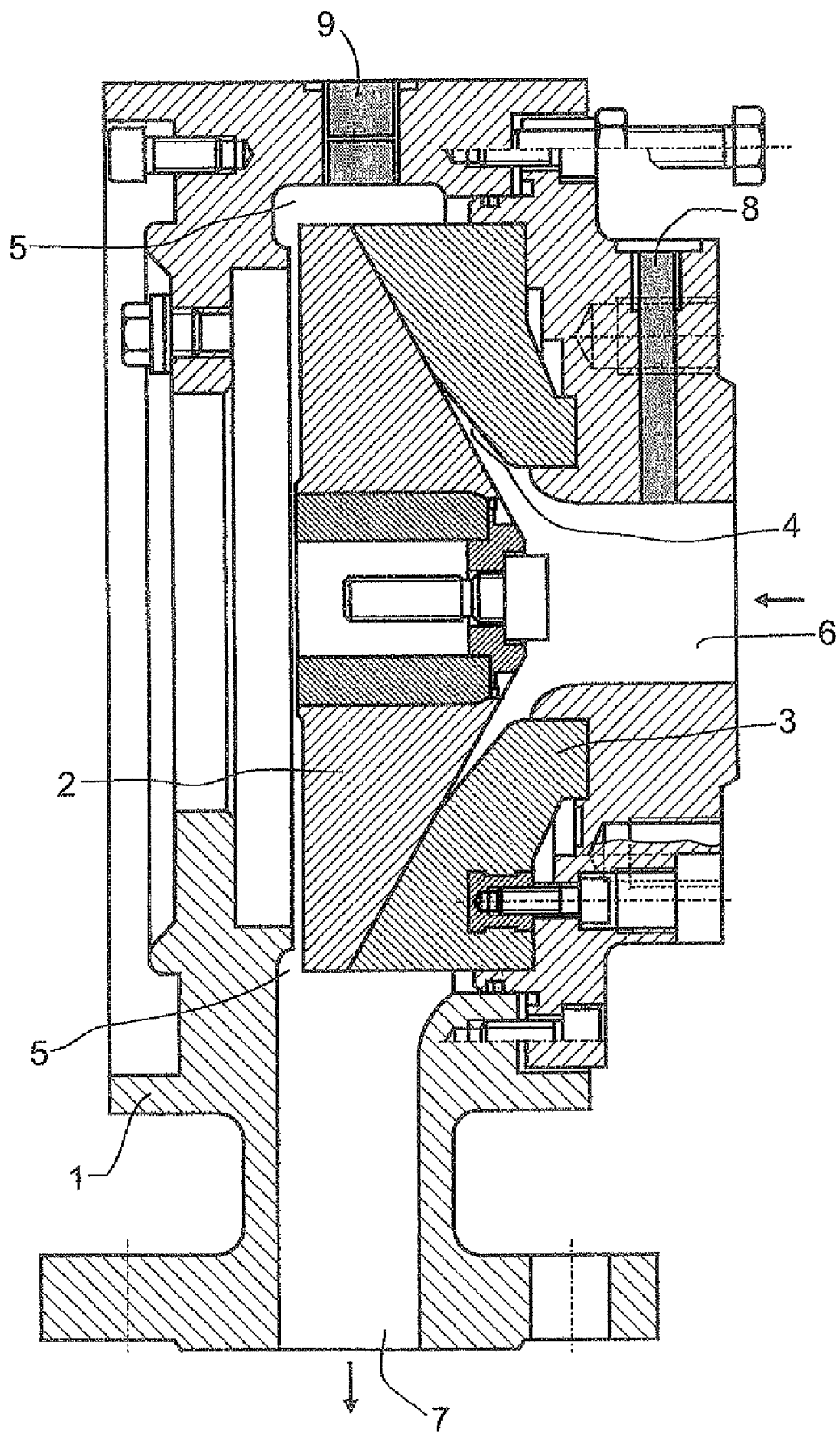

ROTOR/STATOR DEVICE AND METHOD FOR SALT-FREE COAGULATION OF POLYMER DISPERSIONS

PRIORITY

Priority is claimed as a national stage application, under 35 U.S.C. 371, to PCT/EP2006/050749, filed Feb. 8, 2006, which claims priority to German application 10 2005 006 765.4, filed Feb. 15, 2005.

The invention relates to a rotor/stator apparatus, and to a process for the salt-free coagulation of polymer dispersions.

Many polymers are prepared by homo- or copolymerization of suitable monomers in a liquid medium, e.g. by emulsion, miniemulsion or microsuspension polymerization. Here, the polymer precipitates in the form of a usually aqueous dispersion of solid, from which the polymer has to be separated out, unless the dispersion is not to be used as such.

The polymers are usually separated out from the dispersion by coagulation. There is a wide variety of different known methods for this. For example, dispersions can be coagulated by adding strong electrolytes. This is mostly done using salts which comprise polyvalent cations, such as $Ca^{2+}$, $Mg^{2+}$ or $Al^{3+}$. A disadvantage of this method is that relatively large amounts of precipitating agents remain in the product and impair important product properties. Downstream washing of the precipitated polymer with large amounts of water is therefore necessary, and this causes problems in terms of costs and the environment. Another disadvantage of precipitation with electrolytes is that the precipitated product is frequently produced as a clump which comprises unprecipitated material or excess precipitating agent, or as very finely divided material difficult to separate out by sedimentation or filtration.

It has also become known that polymer dispersions can be coagulated by subjecting them to high shear forces. Here, the respective polymer dispersion is subjected to high shear forces until the polymer particles agglomerate. If the solids content of the polymer is above 20%, the polymer coagulated in this way can become pasty to crumbly.

DE-A-196 54 169 discloses a process for coagulating graft-rubber dispersions, where coagulation is brought about using shear-precipitation in a stator-rotor arrangement. Both the stator and the rotor, which rotates within the stator, have slots through which the dispersion is passed radially from the inside to the outside as a result of the rotation of the rotor. The shear to which the dispersion is subjected here is strong enough for it to coagulate. The process described in that publication has a number of disadvantages: the precipitation apparatus has to be designed individually for each specific type of dispersion. Changing types of dispersion requires changes in the engineering of the apparatus. The precipitation apparatus described cannot always achieve complete precipitation. For this, inoculation with a salt solution is often required, but salt residues then remain in the product and can be problematic in sensitive applications. The entire apparatus has to be purged regularly, thoroughly and completely, otherwise the precipitation yield falls or a pressure increase arises prior to the shearing apparatus, resulting in shut down of the dispersion-conveying units. Furthermore, if throughput through the apparatus is too low, the rubber plastifies. The gap width can only be changed via changeover of screw elements, and this is clearly complicated and reduces plant availability.

Against that background, it is an object of the invention to provide an improved apparatus and a corresponding process which in particular ensures more cost-effective operation, with increased service times and high precipitation yield, i.e. very small proportions of unprecipitated dispersion for purely physical precipitation, without addition of precipitating salts.

The object is achieved via a rotor/stator apparatus for the salt-free coagulation of polymer dispersions with a bearing block, a casing, a rotor shaft mounted therein, on whose end directed toward the casing a rotor designed with a conical surface has been secured, there being a stator secured within the casing and concentrically associated with the rotor, where those surfaces that face toward one another of the rotor and of the stator form a shear gap enclosed by an annular space, upstream of which there is an axial feed neck and downstream of which there is at least one radial outlet neck, and where rotor and stator have been mounted so as to be capable of axial shift in order to adjust the gap width, wherein one or more purging necks in the form of holes extending to the exterior has/have been provided in the region of the axial feed neck in the casing and/or in the stator.

The invention is based on a rotor/stator apparatus as described in DE 197 20 959 for the purposes of dispersion, distribution and homogenization, and known by the name Supraton®: rotor and stator form, between the surfaces facing toward one another, a conical shear gap whose width can be adjusted via axial shift of rotor and/or stator. The apparatus has an axial feed neck for the feed, to the shear gap, of the mixture to be treated, and has a radial outlet neck for the removal of the same from the shear gap.

According to the invention, this rotor/stator apparatus is used for the processing operation opposite to that of DE 197 20 959, and specifically for the coagulation of polymer dispersions, and is modified as follows for this purpose:

In the region of the axial feed neck, one or more purging necks has/have been provided in the form of holes extending to the exterior. As an alternative, or additionally, one or more purging necks may also have provided in the form of holes extending to the exterior in the stator.

It is also possible to provide one or more holes extending to the exterior in the pipeline immediately prior to the rotor/stator apparatus. In another preferred embodiment, one or more further purging necks may also have been designed for the purging of the annular space around the shear gap.

One hole alone may be sufficient, but it is also possible to provide two or more holes. These may preferably have been arranged symmetrically with respect to one another.

The geometry of the holes is unimportant for the invention, and in particular circular/cylindrical holes may be used. It is advantageous to select the width of the hole aperture(s) so as to permit problem-free through-flushing of the feed aperture by way of the hole aperture. In particular, the width of the hole aperture(s) may be from 1 to 50 mm, preferably from 3 to 30 mm. A nozzle may have been installed into the hole aperture in order to improve clean-off of the wall of the region of the feed aperture as far as the shear gap.

Those surfaces of rotor and stator that face toward one another and that form the shear gap may be smooth, rough, or structured surfaces.

In order to increase shear forces, elevations or depressions (gear rings, pockets, etc.) may advantageously also have been provided at those areas of rotor and stator that face toward one another, thus producing double-gap-double-cavity series or a combination of cavity and gap, and so that the outlet from the gap or from the cavity becomes available only on overlap of two slots or cavities, the result being very high local shear rates with high-frequency oscillating forces which permit lastingly high precipitation yields.

Rotor and stator may be composed of different materials suitable for the properties of the starting materials and for the respective precipitation task, taking into account the high velocities arising during operation and the corresponding centrifugal forces. By way of example, suitable alloy steels may be used, as may ceramics, SiC mineral casting, specialty plastics, or other suitable materials, those mentioned being merely examples which are not intended to represent any kind of restriction. Rotor and stator are generally manufactured from the same material, but it is also possible to manufacture the two items from different materials.

This invention also provides a process for the salt-free coagulation of polymer dispersions in a rotor/stator apparatus with a bearing block, a casing, a rotor shaft mounted therein, on whose end directed toward the casing a rotor designed with a conical surface has been secured, there being a stator secured within the casing and concentrically associated with the rotor, where those surfaces that face toward one another of the rotor and of the stator form a shear gap enclosed by an annular space, upstream of which there is an axial feed neck and downstream of which there is at least one radial outlet neck, and where rotor and stator have been mounted so as to be capable of axial shift in order to adjust the gap width, which comprises feeding the polymer dispersion by way of the axial feed neck, conveying it through the shear gap between rotor and stator, and during this procedure precipitating it at predetermined shear rate and shear deformation, and discharging it by way of the radial outlet neck(s).

During operation, coagulates also form by deposition prior to the gap, in the region of the feed aperture, as a result of the shear rates occurring there, and this can block the inlet for the aqueous polymer dispersion and interfere with, or prevent, operation.

According to the invention, these problems are mitigated or prevented by flushing the feed aperture with water by way of the one or more holes, continuously or preferably in cycles, in particular also during operation of the coagulation apparatus. Conventional equipment is provided here for water-feed cycles, in particular solenoid valves, if appropriate combined with injection nozzles.

The problems of blocking via the formation of deposits also arises behind the shear gap: if not more than one purging neck has been provided, a preferential flow direction can form in the annular space, thus blocking a portion of the annular space. Partial interference with the discharge from the shear gap can lead to blockages or to plastifying of the rubber in the shear gap. Formation of deposits can also be inhibited via introduction of further outlet necks.

If, in addition to the existing radial outlet necks from the annular space around the shear gap, one or more radial purging necks is/are provided through which the annular space can be purged with water, the result is a substantial reduction in the viscosity of the precipitated dispersion in the annular space, thus permitting the precipitated material to flow away, or permitting conveying even through relatively long lines by way of the action of the pump via the shear apparatus. At the same time, formation of deposits is inhibited.

The process is preferably carried out at a shear rate of from 1000 to 1 million s$^{-1}$ and with a shear deformation of from 1 to 100 000. The rotation rate of the rotor is preferably in the range from 50 to 10 000 rpm, in particular from 200 to 8000 rpm.

By way of example, the inventive process may be used for the coagulation of aqueous polymer dispersions, and preferably of rubber dispersions, in particular of graft rubber dispersions, these being composed, for example, of:

from 60 to 100 parts by weight, based on the total weight of the finished dispersion, of at least one monomer (main monomer) capable of incorporation via polymerization, from 0 to 35 parts by weight, preferably from 0 to 20 parts by weight, of at least one functional monomer (comonomer), and from 0 to 5 parts by weight, preferably from 0 to 3 parts by weight, of an $\alpha,\beta$-unsaturated mono- or dicarboxylic acid, preferably from 0 to 3% by weight.

The main monomer has preferably been selected from:

esters preferably composed of $\alpha,\beta$-monoethylenically unsaturated mono- or dicarboxylic acids having from 3 to 6 carbon atoms, for example acrylic acid, methacrylic acid, maleic acid, fumaric acid or itaconic acid, and from in general $C_1$-$C_{12}$ alkanols, preferably $C_1$-$C_8$ alkanols and in particular $C_1$-$C_4$ alkanols. Particular esters of this type are methyl, ethyl, n-butyl, isobutyl, tert-butyl and 2-ethylhexyl acrylate and methacrylate;

vinylaromatic compounds, such as styrene, $\alpha$-methylstyrene, $\alpha$-chlorostyrene and vinyltoluenes;

vinyl esters of $C_1$-$C_{18}$ mono- or dicarboxylic acids, for example vinyl acetate, vinyl propionate, vinyl n-butyrate, vinyl laurate and vinyl stearate;

butadiene.

Particularly preferred main monomers are methyl methacrylate, methyl acrylate, n-butyl methacrylate, tert-butyl methacrylate, ethyl acrylate, n-butyl acrylate, 2-ethylhexyl acrylate, styrene and vinyl acetate and n-butyl acrylate and butadiene are very particularly preferred.

Particularly suitable comonomers are:

linear 1-olefins, branched-chain 1-olefins and cyclic olefins, e.g. ethene, propene, butene, isobutene, pentene, cyclopentene, hexene, cyclohexane, octene, 2,4,4-trimethyl-1-pentene, if appropriate mixed with 2,4,4-trimethyl-2-pentene, $C_8$-$C_{10}$ olefin, 1-dodecene, $C_{12}$-$C_{14}$ olefin, octadecene, 1-eicosene ($C_{20}$), $C_{20}$-$C_{24}$ olefin; oligoolefins prepared with metallocene catalysis and having a terminal double bond, e.g. oligopropene, oligohexene and oligooctadecene; olefins prepared by cationic polymerization with a high proportion of $\alpha$-olefin, for example polyisobutene. However, it is preferable for no ethene and no linear 1-olefin to be incorporated by polymerization into the polymer.

Acrylonitrile, methacrylonitrile.

Vinyl and allyl alkyl ethers having from 1 to 40 carbon atoms in the alkyl radical, where the alkyl radical may also have other substituents, such as hydroxyl, amino or dialkylamino, or they may have one or more alkoxylate groups, for example methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and also the corresponding allyl ethers, and mixtures of these.

Acrylamides and alkyl-substituted acrylamides, e.g. acrylamide, methylacrylamide, N-tert-butylacrylamide, N-methyl(meth)acrylamide.

Sulfo-comprising monomers, e.g. allylsulfonic acid, methallylsulfonic acid, styrenesulfonate, vinylsulfonic acid, allyloxybenzenesulfonic acid, 2-acrylamido-2-methylpropanesulfonic acid, and the appropriate alkali metal salts or ammonium salts of these, and mixtures of these, and also sulfopropyl acrylate, sulfopropyl methacrylate.

$C_1$-$C_4$-Hydroxyalkyl esters of $C_3$-$C_6$ mono- or dicarboxylic acids (see above), in particular of acrylic acid, methacrylic acid or maleic acid, or derivatives of these alkoxylated with from 2 to 50 mol of ethylene oxide, propylene oxide, butylene oxide, or mixtures of these, or esters, with the acids mentioned (monomers $b_6$), of $C_1$-$C_{18}$ alcohols alkoxylated with from 2 to 50 mol of ethylene oxide, propylene oxide, butylene oxide or mixtures of these, for example hydroxyethyl (meth)acrylate, hydroxypropyl (meth)acrylate, 1,4-butanediol monoacrylate, ethyldiglycol acrylate, methylpolyglycol acrylate (11 EO), (meth)acrylates of $C_{13}$/$C_{15}$ oxoalcohols reacted with 3, 5, 7, 10 or 30 mol of ethylene oxide, or mixtures of these.

Vinylphosphonic acid, dimethyl vinylphosphonate and other phosphorus-comprising monomers.

Alkylaminoalkyl (meth)acrylates, alkylaminoalkyl(meth)acrylamides or quaternization products of these, for example 2-(N,N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl-(meth)acrylamide, 3-dimethylaminopropyl(meth)acrylamide, 3-trimethylammoniumpropyl(meth)acrylamide chloride.

Allyl esters of $C_1$-$C_{30}$ monocarboxylic acids.

N-Vinyl compounds, such as N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, 4-vinylpyridine.

Diallyldimethylammonium chloride, vinylidene chloride, vinyl chloride, acrolein, methacrolein.

Monomers comprising 1,3-diketo groups, for example acetoacetoxyethyl (meth)acrylate and diacetoneacrylamide, monomers comprising urea groups, for example ureidoethyl (meth)acrylate, acrylamidoglycolic acid, methyl methacrylamidoglycolate.

Monomers comprising silyl groups, for example trimethoxysilylpropyl methacrylate.

Monomers comprising glycidyl groups, for example glycidyl methacrylate.

Dispersions suitable for the novel coagulation process, besides normal emulsions, are in particular graft-rubber dispersions which have been prepared in aqueous emulsion at least in the final stage of the graft polymerization, by grafting of the elastomers with the monomers for the graft shell.

For the purposes of the present invention, graft rubbers are in particular those graft polymers in which monomers forming hard thermoplastics, for example in particular styrene, acrylonitrile and/or methyl methacrylate, are grafted as a graft shell onto particle cores composed of soft rubber. This is done by polymerizing or copolymerizing the monomers for the graft shell in the presence of the rubber particles. Suitable soft rubbers are elastomeric polymers and/or copolymers with glass transition temperatures below $-10°$ C., preferably below $-30°$ C. Particularly suitable polymers are elastomeric 1,3-diene homo- and copolymers, such as homo- and copolymers of butadiene, isoprene or chloroprene, preferably butadiene rubber, and also elastomeric acrylate homo- and/or copolymers with the low glass transition temperatures mentioned. Preferred polymers for the graft rubbers coagulated according to the invention are elastomeric acrylate polymers and 1,3-diene homo- and copolymers, for example homo- and copolymers of $C_4$-$C_8$-alkyl acrylates, in particular of n-butyl acrylate and/or 2-ethylhexyl acrylate. Examples of preferred comonomers for the alkyl acrylates are crosslinking monomers having at least two nonconjugated C=C double bonds, for example diallyl maleate, diallyl phthalate, diacrylates and dimethacrylates of diols, such as 1,4-butanediol or 1,6-hexanediol, etc., and also allyl methacrylate and dihydrodicyclopentadienyl acrylate, used in particular in amounts of from 0.5 to 10% by weight of the total amount of monomers in the elastomer preparation, and also polar monomers, such as acrylic acid, methacrylic acid, maleic anhydride, acrylamide, methacrylamide, N-methylolacrylamide and -methacrylamide, and alkyl ethers of these. The proportion of the elastomers in the graft rubber is generally from 30 to 85% by weight. The novel process may be used without difficulty to coagulate graft rubbers whose elastomer proportion is more than 30% by weight, based on the total solids content.

Suitable monomers for polymerizing-on the graft shell are in particular monomers and mixtures of these which form hard polymers or copolymers with glass transition temperatures above $+50°$ C. The type of monomer(s) depends here to a large extent on the type of the thermoplastics which form the polymer matrix after blending with the graft rubber and with which the graft shell should have some degree of compatibility or affinity, in order to achieve a fine two-phase distribution of the graft rubbers in the matrix. Particularly suitable and usual monomers having from 8 to 12 carbon atoms are, for example, styrene, α-methylstyrene, and also styrenes and α-methylstyrenes which have one or more alkyl substituents, in particular methyl substituents, on the benzene ring. They may be the sole monomers for preparing the graft shell, or be used in a mixture with other monomers, such as methyl methacrylate, methacrylonitrile or preferably acrylonitrile, in which case the proportion of methacrylonitrile monomer units and/or acrylonitrile monomer units in the graft shell is from 0 to 45% by weight, preferably from 10 to 40% by weight, of the graft shell. Preference is given to mixtures of styrene with from 10 to 40% by weight of acrylonitrile, based on the total amount of monomers. Other preferred monomers which may be mentioned for preparing the graft shell are methacrylates and acrylates, preferably methyl methacrylate, which may also be used as sole monomer or as the quantitatively predominant monomer for preparing the graft shell. Other suitable comonomers for preparing the graft shell are maleic anhydride, maleimide, N-phenylmaleimide, acrylic acid and methacrylic acid.

Examples of the preparation of dispersions of this type suitable for the application of shear precipitation are described, for example, in DE-A-3 22 75 55, DE-A-3 14 93 58 and DE-A-3 41 41 18, which are expressly incorporated herein by way of reference. However, these are in the nature of examples. The application of the shear precipitation according to the invention is not restricted to the examples of dispersions mentioned here.

The invention achieves further advantages in addition to mitigation or elimination of the problems of blocking in the rotor/stator apparatus, in particular in the feed aperture and the annular space around the shear gap:

The conical design of the shear gap achieves conveying action in the apparatus similar to that of a centrifugal pump, and this action can be utilized for the conveying of the polymer dispersion to the rotor/stator apparatus and also for the discharge of the precipitated polymer dispersion from the apparatus.

The operation of the inventive process is entirely salt-free and, respectively, free from addition of coagulants. Practical complete precipitation takes place, i.e. the precipitation yield is high at 95%, preferably 98% or higher. The precipitation yield has the following defining formula: $PY=100-SC2/SC1\times(100-SC1)/(1-SC2/100)$, where PY is the precipitation yield, SC1 is the total solids content of the unfiltered initial specimen prior to squeezing to remove liquid, and SC2 is the solids content in the filtrate 2, in each case in %. To determine SC2, liquid is removed from the shear-precipitated initial specimen by squeezing in a muslin cloth, and the filtrate 1 arising during this procedure is filtered off by way of a paper filter in order to obtain the filtrate 2. These high precipitation yields are advantageous for avoidance of problems in subsequent processing steps, in particular thermal treatment. The operation of the process is completely salt-free, i.e. no addition of salt is required even to initiate the physical precipitation process ("inoculation"), the result being to ensure a continuously high precipitation yield and correspondingly consistent operation.

The invention is explained in more detail below, using a FIGURE and an Inventive Example.

The single FIGURE, FIG. 1, gives a diagram of a preferred embodiment of a rotor/stator apparatus of the invention.

A rotor 2 and a stator 3 have been arranged in a casing 1 and have conical surfaces which face toward one another and which form a shear gap 4. Upstream of the shear gap 4 there is an axial feed neck 6, and downstream of the shear gap there is at least one radial outlet neck, and the shear gap is enclosed by an annular space 5. In the region of the axial feed neck 6 a purging neck 8 has been provided by way of example in the easing 1, and takes the form of a hole extending to the exterior. A further purging neck 9 has been provided for the purging of the annular space 5 around the shear gap 4, likewise in the form of a hole extending to the exterior.

INVENTIVE EXAMPLE 1

Precipitation of an Acrylate Graft Rubber

A graft rubber was prepared in accordance with the specification described in DE-A 32 27 555:
Preparation of a Core Rubber, Component A1:

16 parts of butyl acrylate and 0.4 part of tricyclodecenyl acrylate are heated to 60° C. in 150 parts of water with addition of 0.5 part of the sodium salt of a $C_{12}$-$C_{18}$ paraffinsulfonic acid, 0.3 part of potassium persulfate, 0.3 part of sodium hydrogencarbonate, and 0.15 part of sodium pyrophosphate with stirring. 10 minutes after the start of the polymerization reaction, a mixture of 82 parts of butyl acrylate and 1.6 parts of tricyclodecenyl acrylate was added within a period of 3 hours. Once monomer addition had ended, the reaction was permitted to continue for a further hour. The resultant latex of the crosslinked butyl acrylate polymer had a solids content of 40% by weight. The average particle size (weight-average) was determined as 216 nm. The particle size distribution was narrow (quotient Q=0.29).
Preparation of a Core Rubber, Component A2:

The following liquid feeds were added at 60° C. to an initial charge of 2.5 parts of the latex prepared in Example 1 (component A) after addition of 50 parts of water and 0.1 part of potassium persulfate during the course of 3 hours: firstly a mixture of 49 parts of butyl acrylate and 1 part of tricyclodecenyl acrylate, and secondly a solution of 0.8 part of the sodium salt of a $C_{12}$-$C_{18}$ paraffinsulfonic acid in 25 parts of water. Once the liquid feed had ended, polymerization was continued for 2 hours. The resultant latex of the crosslinked butyl acrylate polymer had a solids content of 40%. The average particle size (weight–average) of the latex was determined as 410 nm. The particle size distribution was narrow (Q=0.1).
Preparation of the Graft Rubber, Component B1:

150 parts of the polybutyl acrylate latex obtained as in (a) were mixed with 20 parts of styrene and 60 parts of water and heated to 65° C. over a period of 3 hours, with stirring, after further addition of 0.03 part of potassium persulfate and 0.05 part of lauroyl peroxide. Once the first graft copolymerization stage had ended, the degree of grafting of the graft copolymer was 17%. This graft copolymer dispersion was polymerized for a further 3 hours with 20 parts of a mixture of styrene and acrylonitrile (ratio 75:25) without further additives. Once the graft copolymerization had ended, the product was precipitated from the dispersion by means of calcium chloride solution at 95° C., washed with water and dried in a stream of hot air. The degree of grafting of the graft copolymer was 35%, and the average particle size of the latex particles was determined as 238 nm.
Preparation of the Graft Rubber, Component B2:

150 parts of the polybutyl acrylate latex obtained as in A2 were mixed with 20 parts of styrene and 60 parts of water and heated to 65° C. over a period of 3 hours, with stirring, after further addition of 0.03 part of potassium persulfate and 0.05 part of lauroyl peroxide. The dispersion obtained in this graft copolymerization was then polymerized with 20 parts of a mixture of styrene and acrylonitrile in a ratio of 75:25 for a further 4 hours.

The reaction product was then isolated via precipitation in an inventive rotor/stator arrangement composed of a silicon carbide mineral casting whose shear gap between rotor and stator measured 1.5 mm with throughput 1400 kg/h and with a rotor rotation rate of 6250 rpm, the apparatus being purged as follows during the precipitation process:

The annular space (reference 5 in FIG. 1) enclosing the shear gap was continuously purged during the entire precipitation procedure by way of three connections at the 3, 9, and 12 o'clock position, in each case with 60 l of water per hour.

The purge cycles, in each case 5 sec every 3 min, in each case using 500 m$^3$ of water per hour, were operated by way of the purging neck corresponding to reference 8 in FIG. 1 in the region of the axial feed aperture (reference 6).

Cycles, in each case 5 sec every 3 min, in each case using 500 m$^3$ of water per hour, were likewise used to purge the pipeline at a distance of about 10 cm prior to the connection flange to the rotor/stator apparatus.

The precipitation yield obtained was from 98.6 to 99.3%.

INVENTIVE EXAMPLE 2

Precipitation of a Butadiene Rubber

A butadiene rubber as in Example 1 of DE-A 196 54 169 was precipitated in a rotor/stator arrangement.
Preparation of Graft Rubber Dispersion with Polybutadiene as Graft Base (as in Example 1 of DE-A 196 54 169):

60 parts of butadiene were polymerized at 65° C. to monomer conversion of 98% in a solution of 0.6 part of tert-dodecyl mercaptan, 0.7 part of sodium $C_{14}$-alkylsulfonate as emulsifier, 0.2 part of potassium peroxodisulfate and 0.2 part of sodium disulfate in 80 parts of water. The average particle size of the polybutadiene in the resultant latex was 100 nm, and the polybutadiene was therefore agglomerated via addition of 25 parts of a 10% strength emulsion of a copolymer of 96% of ethyl acrylate and 4% of methacrylamide, the resultant average particle size being 350 nm. The glass transition temperature of the polybutadiene was −85° C.

40 parts of water, 0.4 part of sodium $C_{14}$-alkylsulfonate, 0.2 part of potassium peroxodisulfate were added to the product.

40 parts of a mixture of 70% of styrene and 30% of acrylonitrile were gradually added within a period of 4 hours, and the mixture was kept at 7° C., with stirring. Monomer conversion was practically quantitative. The glass transition temperature of a copolymer of 70% of styrene and 30% of acrylonitrile is about +105° C.

The resultant dispersion was coagulated in a rotor/stator arrangement which had been designed as a cone-and-pocket device with a row of slots applied to each of those outer surfaces of rotor and stator that face toward one another, with a shear gap of 2.5 mm between rotor and stator, a throughput of 1400 kg/h, and a rotor rotation rate of 6250 rpm.

The purging of annular space, in the flange toward the axial feed neck and in the pipeline took place as described in Inventive Example 1.

The precipitation yield achieved was from 98.5 to 99.2%.

The invention claimed is:

1. A process for salt-free coagulation of polymer dispersions in a rotor/stator assembly, the rotor/stator assembly including a casing, a rotor shaft rotatably mounted within the casing, a rotor affixed to the rotor shaft, the rotor having a conical surface, a stator affixed to the casing and concentrically associated with the rotor, the conical surface and a surface of the stator facing toward each other and forming a shear gap surrounded by an annular space within the casing, wherein the assembly is capable of axial shifts in order to adjust the shear gap width, the process comprising:
    feeding a polymer dispersion by way of an axial feed neck into the rotor/stator assembly, the axial feed neck being upstream of the shear gap;
    conveying the polymer dispersion through the shear gap;
    precipitating the polymer dispersion at a predetermined shear rate and a predetermined shear deformation while conveying the polymer dispersion through the shear gap;
    discharging the precipitated polymer dispersion by way of an outlet neck from the rotor/stator assembly, the radial outlet neck being downstream of the shear gap; and
    flushing the axial feed neck and/or the annular space in the rotor/stator assembly with water during operation of the rotor/stator assembly using one or more ports formed in at least one of a pipeline coupled to the axial feed neck, the stator, and the casing.

2. The process of claim 1, wherein the port in the pipeline is disposed nearby the rotor/stator assembly.

3. The process of claim 1, wherein the port in the stator comprises a purging neck.

4. The process of claim 1, wherein the port in the casing comprises a purging neck.

5. The process of claim 1, wherein flushing the rotor/stator assembly with water includes flushing the rotor/stator assembly with water in cycles.

6. The process of claim 1, wherein the annular space is purged with water using the port formed in the casing.

7. The process of claim 1, wherein the predetermined shear rate ranges from 100 to 1 million s-1 .

8. The process of claim 1, wherein the predetermined shear deformation ranges from 1 to 100,000.

9. The process of claim 1, wherein the polymer dispersion is a rubber dispersion.

10. The process of claim 9, wherein the rubber dispersion is a graft rubber dispersion.

* * * * *

UNITED STATES PATENT AND TRADEMARK OFFICE
CERTIFICATE OF CORRECTION

PATENT NO. : 8,362,200 B2  
APPLICATION NO. : 11/816362  
DATED : January 29, 2013  
INVENTOR(S) : Güntherberg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1503 days.

Signed and Sealed this

First Day of September, 2015

Michelle K. Lee
*Director of the United States Patent and Trademark Office*